United States Patent [19]

Anzai et al.

[11] 4,413,285
[45] Nov. 1, 1983

[54] FACSIMILE APPARATUS

[75] Inventors: Masayasu Anzai, Hitachi; Kiyohiko Tanno, Katsuta; Hideo Hirane, Hitachi; Akira Shimada, Hitachi; Masaharu Tadauchi, Hitachi, all of Japan

[73] Assignee: Hitachi, Ltd., Tokyo, Japan

[21] Appl. No.: 304,899

[22] Filed: Sep. 23, 1981

[30] Foreign Application Priority Data

Sep. 24, 1980 [JP] Japan ............................... 55/131518

[51] Int. Cl.³ .............................................. H04N 1/40
[52] U.S. Cl. ................................... 358/260; 358/257; 358/280; 358/285; 358/293
[58] Field of Search ............... 358/285, 293, 300, 280, 358/257, 260

[56] References Cited

U.S. PATENT DOCUMENTS

| | | | |
|---|---|---|---|
| 4,032,888 | 6/1977 | Broyles | 358/285 |
| 4,046,471 | 9/1977 | Branham | 358/300 |
| 4,169,275 | 9/1979 | Gunning | 358/280 |
| 4,353,096 | 10/1982 | Sakurai | 358/280 |

*Primary Examiner*—Howard Britton
*Attorney, Agent, or Firm*—Antonelli, Terry & Wands

[57] ABSTRACT

A facsimile apparatus having a transmitting unit for scanning an image of a text to produce an image information signal and converting the image information signal to a coded information signal in a band compressed transmission system for transmission through a transmission line, and a receiving unit for decoding the coded information signal transmitted through the transmission line to reproduce the image information on a recording medium, the facsimile apparatus includes a memory having a memory capacity of at least one page information of the text for storing the information signals representing the image of the text to be transmitted and received. The receiving unit includes clock generator for generating a timing clock for reading out the received information signal stored in the memory converting circuit for converting the information signal read out from the memory means into analog information signal, and scanning type recording medium for feeding the recording medium at a constant speed and recording the image on the recording medium in accordance with the analog information signal read from converting circuit. The memory is responsive to the timing clock from the clock generator to sequentially read out the information signal such that a scanning-start timing at each scanning line in the recording medium is repeated with a constant period.

7 Claims, 9 Drawing Figures

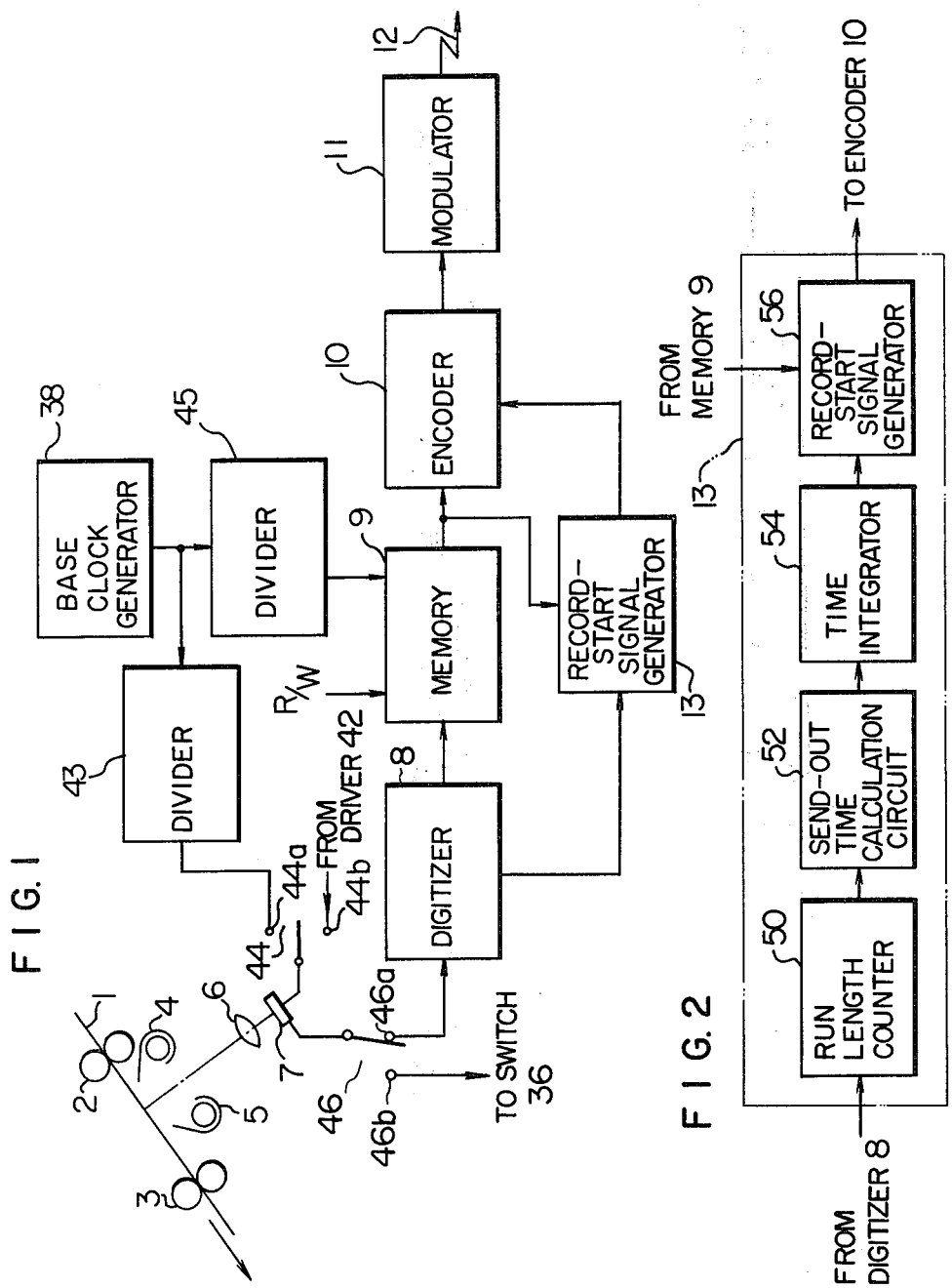

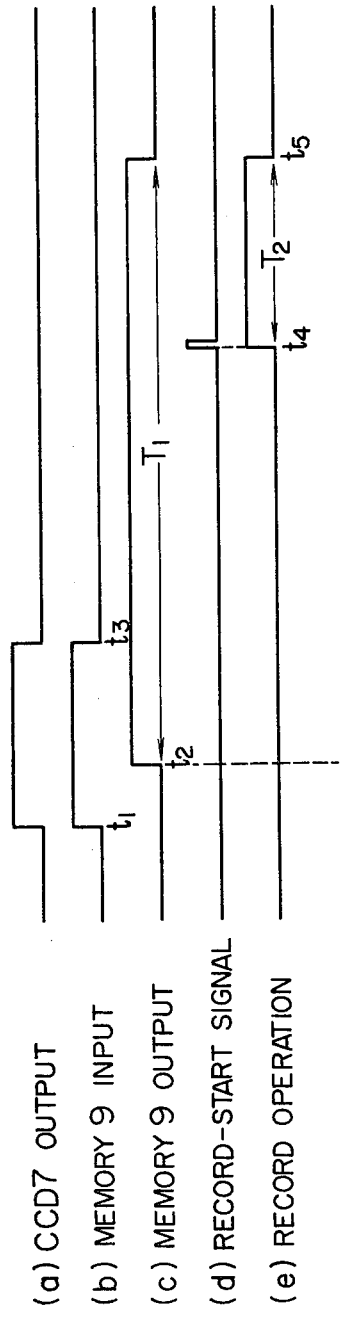
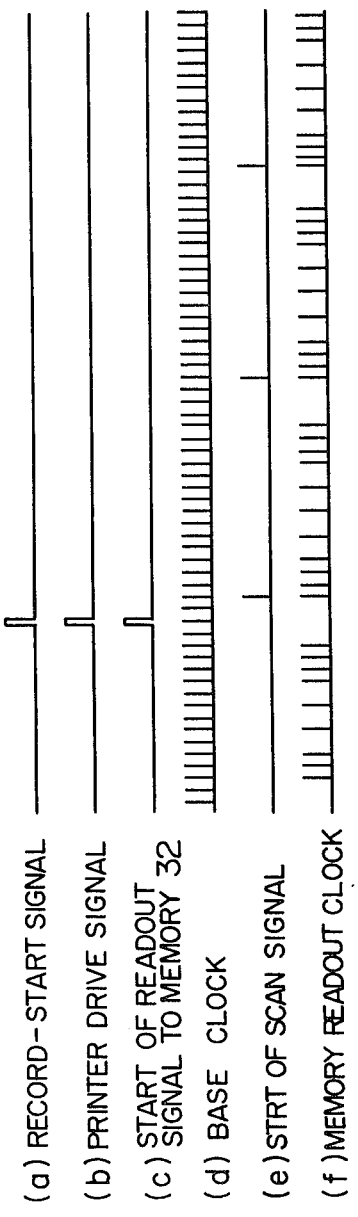

F I G. 4
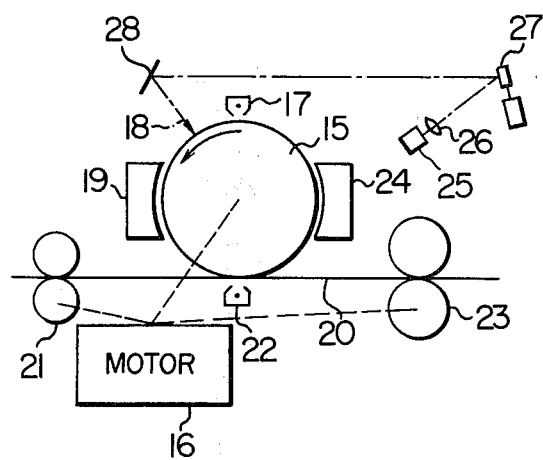
F I G. 5
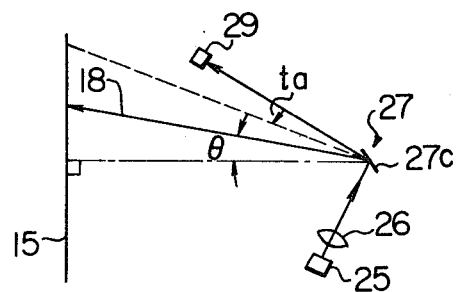

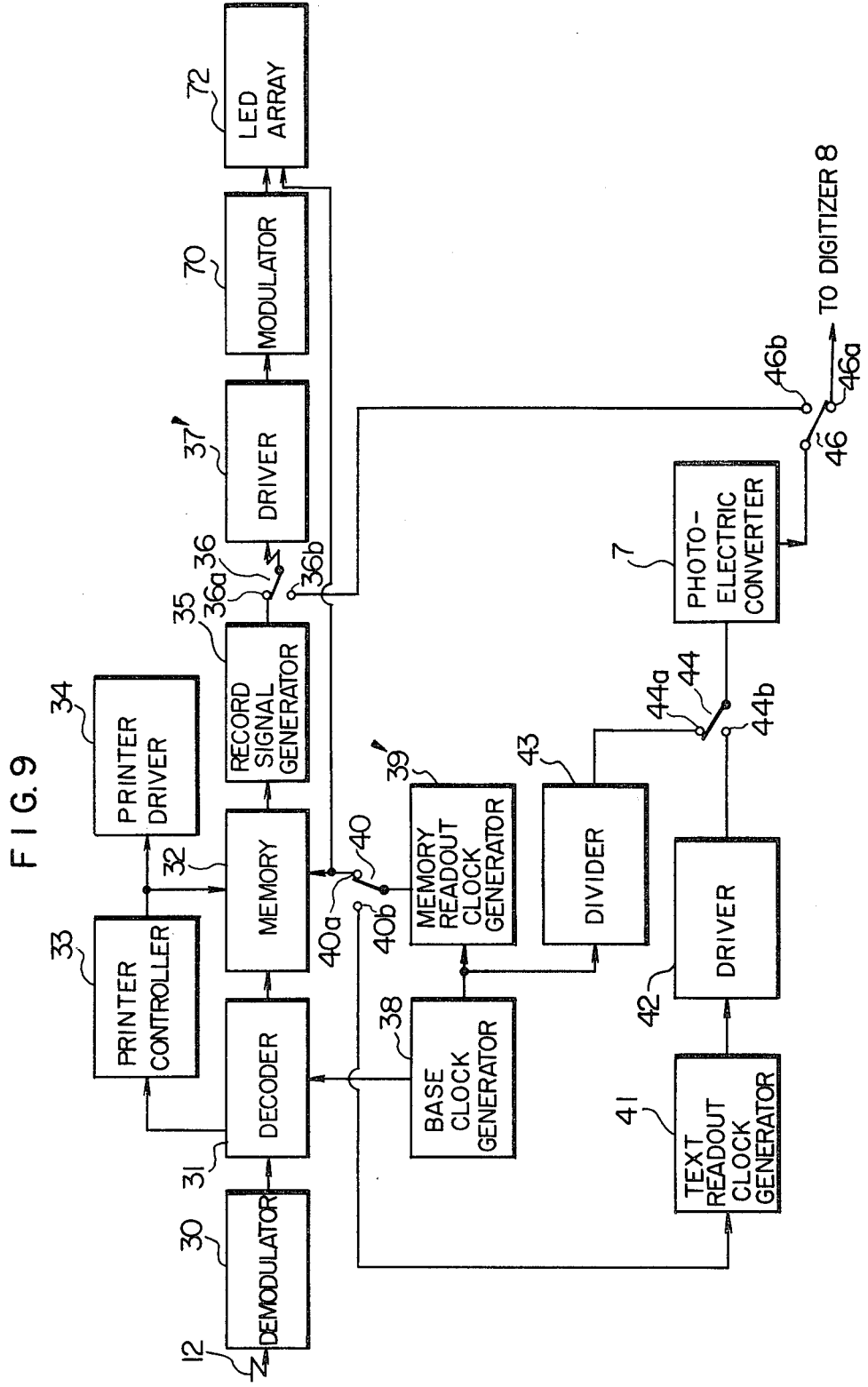

FACSIMILE APPARATUS

BACKGROUND OF THE INVENTION

The present invention relates to a facsimile apparatus, and more particularly a band compressed transmission system facsimile apparatus.

In a prior art band compressed transmission system facsimile apparatus, an analog information signal of a character and graphic image is digitized and the digitized signal is converted to a band compressed coded signal by an encoding circuit in a transmitting station, and the coded signal is decoded in a receiving station and the decoded signal is recorded by recording means at a variable speed depending on the output rate of the transmitting station. When the signal is recorded at a variable speed, the drive speed of the recording medium must be variably controlled or a scanner must be controlled at a variable speed. Accordingly, the mechanism of the record medium drive unit or the scan unit is complex and hence expensive, and it is difficult to precisely control the variable speed. In addition, high speed recording is not attained because of the variable speed control.

SUMMARY OF THE INVENTION

It is an object of the present invention to provide a band compressed transmission system facsimile apparatus capable of recording characters and graphic images at a high speed and with a high quality.

In order to achieve the above object, in accordance with the present invention, scanning recording means having a constant recording medium drive speed and capable of recording characters and graphic patterns at a high speed and with a high quality is used. When a transmitting station transmits a coded information signal in a band compressed system and a receiving station decodes the transmitted signal into an analog information signal and supplies the decoded analog information signal to the recording means, the recording means has to record the signal at a variable speed to comply with the rate of the transmitted information signal and hence the recording means is complex in construction and expensive and the quality of the resulting image is degraded. In order to avoid the above problem, a memory for storing at least one text page of the received information signal is provided in the receiving station so that the image information signal is read from the memory such that the timing for starting scanning at each scanning line in the recording means is repeated with a constant period. For this purpose, a scanning-type recording means having a constant recording medium drive speed is used. With this arrangement, the recording means is simplified in construction and less expensive, the recording speed can be increased and the degradation of the quality of the image is prevented because the signal is recorded at a constant speed.

Thus, according to the present facsimile apparatus, a low cost facsimile apparatus which can record a high quality image at a high speed is provided by recording the image by the scanning type recording means having a constant recording medium feed speed, transmitting the image information signal of the text read at the constant rate in the band compressed transmission system, storing at least one text page of the transmitted image information in a memory and controlling the scanning type recording means to read out the image information signal from the memory such that the scanning type recording means records the image at the constant speed.

BRIEF DESCRIPTION OF THE DRAWINGS

FIG. 1 shows a schematic configuration of a transmitting unit of a typical embodiment of a facsimile apparatus of the present invention.

FIG. 2 shows a configuration of a record-start signal generating circuit in the transmitting unit of FIG. 1.

FIG. 3 shows a time chart for explaining the operation of the transmitting unit.

FIG. 4 shows a schematic configuration of laser beam recording means of a receiving unit.

FIG. 5 shows a diagram for illustrating a scan operation in the laser beam recording means.

FIG. 7 shows a time chart for explaining the operation of the receiving unit of FIG. 6.

FIG. 9 shows a schematic configuration of a further embodiment of the facsimile apparatus of the present invention.

DESCRIPTION OF THE PREFERRED EMBODIMENTS

Figure 6:
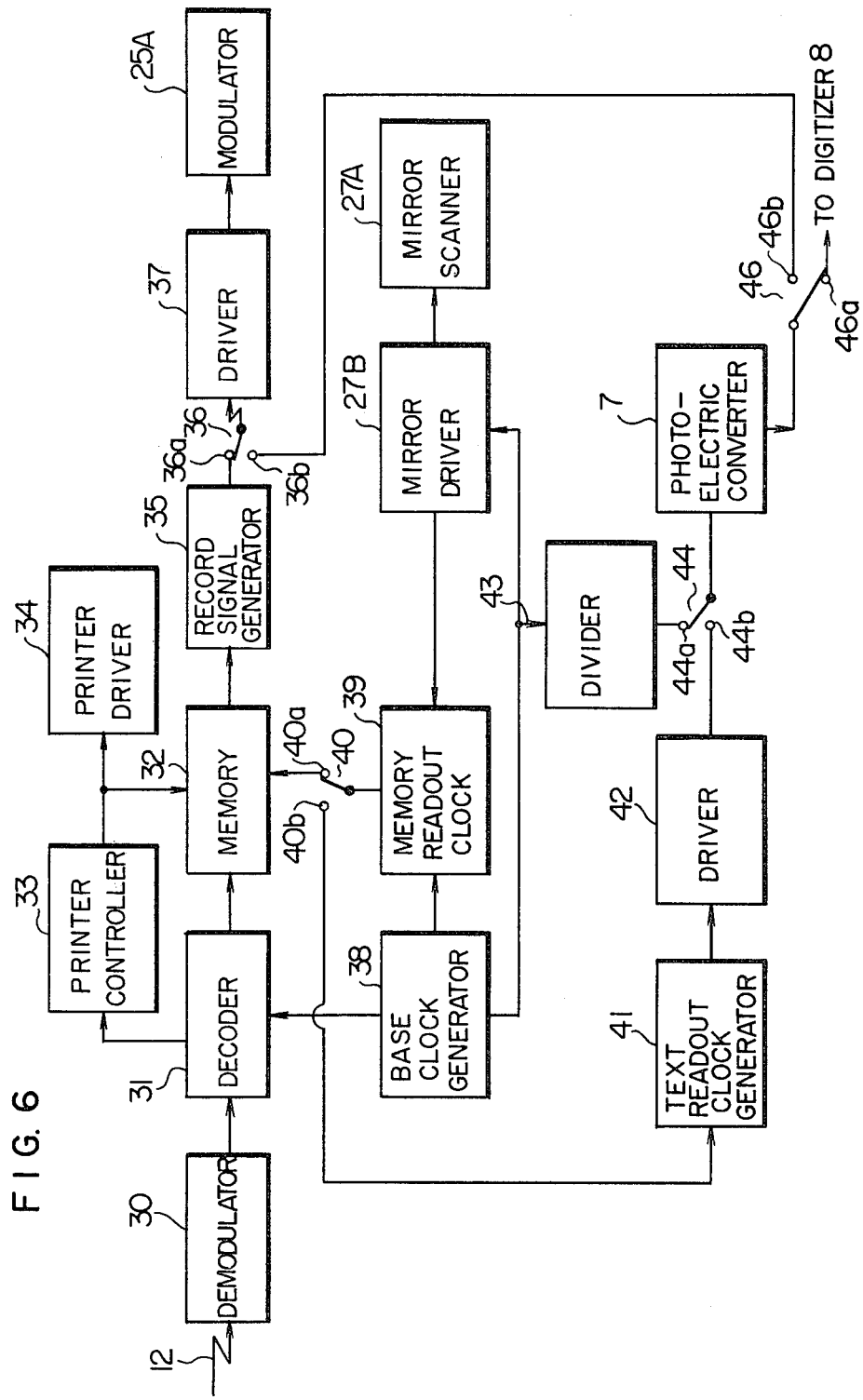
FIG. 6 shows a schematic configuration of the receiving unit in a typical embodiment of the facsimile apparatus of the present invention.

The preferred embodiments of the facsimile apparatus of the present invention will now be explained in detail.

FIG. 1 shows a schematic configuration of a transmitting unit in a typical embodiment of the facsimile apparatus of the present invention, and FIG. 3 shows a time chart for explaining the operation of the transmitting unit. Referring to FIG. 1, a sending text 1 is fed by feed rollers 2 and 3 at a constant speed in a direction shown by an arrow (text feed direction) and a scan area of the sending text 1 is illuminated by illumination lamps 4 and 5. An image on a scan line on the sending text 1 extending transversely to the text feed direction is projected to a photo-electric conversion device 7 (e.g. charge coupled device (CCD)) through a lens 6 so that it is photo-electric converted. An analog information signal representing a density of the image photo-electric converted by the photo-electric conversion device 7 is sequentially read from the photo-electric conversion device 7 in synchronism with a clock which is derived by frequency-dividing a clock signal produced by a base clock generator 38 in a receiving unit shown in FIG. 6 by a frequency divider 43 and supplied through a switch 44. The analog information signal is applied to a wave shaping circuit (digitizing circuit 8) through a switch 46 and the resulting digital information signal is stored in a memory 9 having a memory capacity of at least one page of the sending text 1. After the digital information signal of at least one page of the sending text 1 has been stored in the memory 9, the digital information signal is sequentially read and converted to a band compressed coded signal by an encoding circuit 10, and the coded signal is transmitted through a modulation circuit 11 to a transmission line 12 at a constant signal density. The memory 9 may be constructed to store the coded signal.

The above operation is explained with reference to a time chart shown in FIG. 3. The text 1 is read by the photo-electric conversion device 7 from time $t_1$ to time $t_3$. The output is sequentially supplied to the memory 9 through the digitizing circuit 8. The memory 9 has been set in a write mode by a R/W control signal. Simultaneously with the start of writing to the memory 9 or at the time $t_2$ which is a predetermined time period thereafter, the R/W control signal changes to a read mode so that the content of the memory 9 is sequentially read out in synchronism with a clock signal which is derived by frequency-dividing a base clock from the base clock generator 38 by a frequency divider 45.

On the other hand, the digital information signal is supplied to the memory 9 through the wave shaping circuit 8 and also supplied to a record-start signal generating circuit 13 to generate a record-start signal. The record-start signal generating circuit 13 calculates the time required to send out the digital information signal of one page of the text 1 in the form of a band compressed coded signal, and based on the calculated time, it also calculates the time at which the record-start signal for instructing the start of recording on a recording paper in a receiving unit of another facsimile apparatus connected through the transmission line 12 is to be generated and generates the record-start signal at the calculated time. FIG. 2 shows a configuration of the record-start signal generating circuit 13, in which a run length counter 50 receives the digital information signal from the digitizing circuit 8, and counts the run length of the digital information signal in each line of one page of the text 1. A send-out time calculation circuit 52 sequentially calculates the times $t_1-t_n$ ($t_m$: time required to send out the m-th line information) required to send out the digital information signals of the respective lines of one page in the form of the band compressed coded signal, based on the counts of the run length and in accordance with an encoding rule. A time integration circuit 54 calculates the sum of the calculated times $t_1$ to $t_n$, that is, the time $T_1$ required to send out all of the information of one page of the text 1. The time at which the record-start signal is generated is preferably set to be $T_2$ time period earlier than the time of end of send-out, where $T_2$ is a time required for the receiving unit of another facsimile apparatus for receiving and recording the information sent through the transmission line 12 to record all of the transmitted information signals of one page of the text 1, so that the time of the end of the send-out operation and the time of the end of the recording of the information of one page coincide. Thus, the record-start signal is generated at a $(T_1-T_2)$ time period after the start of send-out at the transmitting unit. Accordingly, the record-start signal generator 56 responds to the readout of the digital information signal from the memory 9 to count the time and generates the start of record signal when the counted time reaches $(T_1-T_2)$. This signal is supplied to the encoding circuit 10 and is sent out with the image information signal.

In the present invention, scanning recording means having a constant recording paper feed speed is used to record the transmitted image information in the receiving unit. The scanning recording means includes an electrographic system, an electrostatic recording system, and a magneto-graphic system. Among others, the electrographic system is fast in speed and provides a record of a high quality. When the electrographic system is used, it is necessary to convert the transmitted information to an optical image and direct the optical image to a photo-conductive and photo-sensitive body to expose the image thereto. This may be attained by directing an image on a CRT tube to the photo-sensitive body through a lens or an optical fiber, scanning a light emitting diode array, switch-scanning a light bulb array or scanning a laser beam.

In the present embodiment, the recording means using the laser beam is explained. The method for scanning the photo-sensitive body is described in Review of Electrical Communication Laboratories, Vol. 24, No. 5-6, 1976, pages 353-362, and the method for scanning the light emitting diode array is described in IEEE Transaction on Electron Device, Vol. ED-19, No. 10, October 1972, pages 1090-1093.

FIG. 4 shows a schematic configuration of the laser beam recording means. A photo-conductive drum 15 having a photo-conductive surface is rotated by a drive motor 16 at a constant speed in the direction of the arrow. A corona charger 17 uniformly charges the surface of the photo-conductive drum 15 and a laser beam 18 repetitively scans the uniformly charged surface of the photo-conductive drum 15 axially of the drum to selectively discharge the charges on the surface of the drum 15 to form an electrostatic latent image. A negative latent image in which the charges in the information regions are discharged is preferable because scan stripes are hardly produced. The electrostatic latent image formed on the surface of the photo-conductive drum 15 is toner-developed by a magnetic brush developer 19. When the negative latent image is used, it is reverse-developed to produce a positive toner image. A recording medium 20 such as a plain paper is fed by a feed roller 21 at a speed equal to a circumferential speed of the photo-conductive drum 15 and contacts the surface of the photo-conductive drum 15 bearing the toner image. Transferring biasing charges are applied by a corona charger 22 at a surface portion of the drum opposite to the contact portion of the recording paper 20 and the drum 15 so that the toner image is electrostatically transferred to the recording paper 20. The transferred image is then fixed when the recording paper passes between fixing rollers 23. After the toner image has been transferred, the surface of the photo-conductive drum 15 passes a cleaner 24 where the residual toners and charges are cleaned off and the photo-conductor drum 15 is ready for recording another image. The laser beam 18 is generated by a laser beam generator 25 including a semiconductor laser generator or an ON-OFF modulator and is irradiated to the surface of the photo-conductive drum 15 through a lens system 26, a scanner 27 having a vibrating mirror or a rotating mirror 27c, and a mirror 28.

In such a laser beam recording means, when the mirror 27c of the scanner 27 is driven at a constant angular velocity, the scan speed of the beam spot irradiated on the surface of the photo-conductive drum 15, in the axial direction of the drum (scan direction), is not constant. Referring to FIG. 5 (in which the mirror 28 of FIG. 4 is omitted), since the surface of the photo-conductive drum 15 is flat in the scan direction, the scan speed of the beam spot is proportional to the deflection angle $\theta$. Accordingly, in order to position the picture cells on the drum at an equal pitch along the scan direction, the laser beam 18 has to be modulated with a frequency which is corresponds to the deflection angle $\theta$.

FIG. 6 shows a block diagram of a receiving unit having a signal processing function as described above. The coded information signal transmitted through the transmission line 12 is demodulated by a demodulator 30 and decoded to a digital information signal representing picture cells by a decoder 31, and the decoded signal is sequentially stored in a memory 32. The decoder 31 also separates control signals (e.g. record start signal, record-end signal, recording density selection signal) from the decoded signal and supplies them to a printer control circuit 33, which controls a printer drive circuit 34 and the memory 32. Of the control signals produced by the printer control circuit 33, the record start signal is supplied to the printer drive circuit 34 as a printer drive signal (FIG. 7b) to activate the printer drive circuit 34 which in turn drives the motor 16 of the laser beam drive means. The control signal is also supplied to the memory 32 as a start of readout signal (FIG. 7c) to start the readout of the stored digital information signal. The record-end signal is supplied to the printer drive circuit 34 to stop the drive of the motor 16 and it is also supplied to the memory 32 to stop the readout.

The memory 32 has a memory capacity which is no smaller than one page of information of a normal size sending text. For example, when a recording density is 7.7 lines per millimeter and a maximum sending text size is A4, a memory capacity of approximately 3.7 M bits is required. If it is desired to erase the read-out information while reading out the stored information signal of a first page and store the received information signal of a second page in the erased area, a memory capacity somewhat larger than 3.7 M bits (e.g. 4 M bits) is required, and if it is desired to erase the stored information signal of the first page after a full page of information signal has been read out, a memory capacity of 7.4 M bits is required to store the received information signal of the second page. The memory 32 may be an IC memory, a magnetic bubble memory or a magnetic disc memory, and the IC memory is preferable. The digital information signal stored in the memory 32 is sequentially read out in synchronism with a memory readout clock pulse from a memory readout clock generator 39 and the read-out digital signal in the form of RZ (Return-to-Zero) is converted to a NRZ (Non-Return-to-Zero) image record signal by a record signal generator 35, thence it is supplied to a driver 37 through a switch 36 to drive a modulator 25A of the laser beam generator 25.

In the decoder 31 and the mirror driver 27B of the scanner 27, the coded signal is decoded to the digital information signal at a constant cycle in accordance with a constant base clock (FIG. 7d) from a base clock generator 38 and the mirror scanner 27A is rotated at a constant angular velocity. On the other hand, when the image digital information signal in the scan direction is read out of the memory 32 at a constant cycle, the recorded image includes a scan distortion because the scan velocity of the laser beam spot on the photo-conductive drum 15 varies with the deflection angle θ, as discussed above. The scan distortion may be avoided if the angular velocity of the mirror scanner 27A of the scanner 27 is variably controlled with the deflection angle θ such that the scan velocity of the beam spot is constant, but this requires a complex mechanism of the scanner 27. Accordingly, in the present embodiment, instead of variably controlling the scan velocity, the readout speed of the memory 32 is varied in accordance with the deflection angle θ.

The memory readout clock generator 39 receives the base clock (FIG. 7d) from the base clock generator 38 and a scan synchronizing signal from the mirror driver 27B which drives the mirror scanner 27A, and based on those signals it generates a readout clock such that the picture cells on the drum 15 drawn by the laser beam spot are positioned at an equal interval. The readout clock is supplied to the memory 32 through a contact 40a of a switch 40. The scan synchronizing signal from the mirror driver 27B is a constant cycle start of scan signal or a mirror angular position signal.

The mirror driver 27B may be constructed such that the start of scan signal is generated a predetermined time period $t_a$ after the detection of the laser beam reflected by the mirror 27c of the scanner 27 by a beam detector 29, as shown in FIG. 5 (that is, when the beam has reached a start of scan point shown by a broken line), or the mirror driver 27B may be provided with a sensor (not shown) for detecting the angular position of the drive shaft of the mirror 27C to detect the angular position of the mirror 27C shown by the broken line in FIG. 5 (start of scan position) and other predetermined angular positions, to produce a mirror angular position signal.

The readout clock generator 39 may be constructed by a time function generating circuit or a variable base clock frequency-dividing circuit so that the readout clock is generated at each incremental displacement of the laser beam spot. The time function generatcircuit or the variable base clock frequency-dividing circuit frequency-divides the base clock at a variable dividing ratio in accordance with the mirror angular position signal from the mirror driver 27B or the start of scan signal (FIG. 7e), to generate the readout clock (FIG. 7f). The dividing ratio is increased as the laser beam spot is moved from the end point of the scan area corresponding to the start of scan point to a midpoint so that the readout clock period is increased. The circuit may be constructed such that it frequency-divides the base clock at a predetermined dividing ratio in response to the start of scan signal, and frequency-divides the base clock at a different dividing ratio after a predetermined time period, or it frequency-divides the base clock at a predetermined dividing ratio in response to the mirror angular position signal indicating the start of scan position and frequency-divides the base clock at a different dividing ratio in response to the mirror angular position signal indicating the next predetermined angular position. The readout clock is not generated during a retrace (fly-back) period between a scan line and the next scan line.

While the readout clock cycle is preferably varied continuously, it may be incrementally varied (e.g. two steps one for each end region and center region as shown in FIG. 7f) in order to simplify the construction of the time function generating circuit or the frequency-dividing circuit.

When the start of readout signal is supplied to the memory 32 from the printer control circuit 33, the memory 32 is ready for readout, and the readout starts in response to the memory readout clock from the generator 39 which is synchronized with the start of scan signal.

The present embodiment is constructed as a facsimile apparatus having a copying function. The copying function is defined as a function to photo-electrically convert the text 1 by the CCD 7 and reproduce the output of the CCD 7 by the laser beam recording means of that apparatus. In order to carry out the copying function, a clock for reading out the analog information signal from the CCD 7 is switched from the output of the base clock generator 38 to the output of the memory readout clock generator 39, by the switch 44. A movable contact of the switch 36 is switched from a contact 36a to a contact 36b and also a movable contact of the switch 46 is switched from a contact 46a to a contact 46b. Thus, the readout clock from the memory readout clock generator 39 is supplied to a text readout clock circuit 41 through a contact 40b of the switch 40 and is supplied to a photo-electric conversion device driver 42 as a clock for the photo-electric conversion device 7. The output clock from the driver 42 is supplied to the photo-electric conversion device 7 through a contact 44b of the switch 44. Consequently, the analog information signal representing the density of the image of the text 1 is read out of the photo-electric conversion device 7 in synchronism with the memory readout clock shown in FIG. 7f, and it is supplied to the driver 37 through the switches 46 and 36. The scanner 27 is driven by the base clock as if the apparatus functions as a facsimile. In this manner, the image of the text 1 is copied on the recording paper 20.

While the memory 9 of the transmitting unit and the memory 32 of the receiving unit are separately provided in the illustrated embodiment, they may share a common memory.

Figure 8:
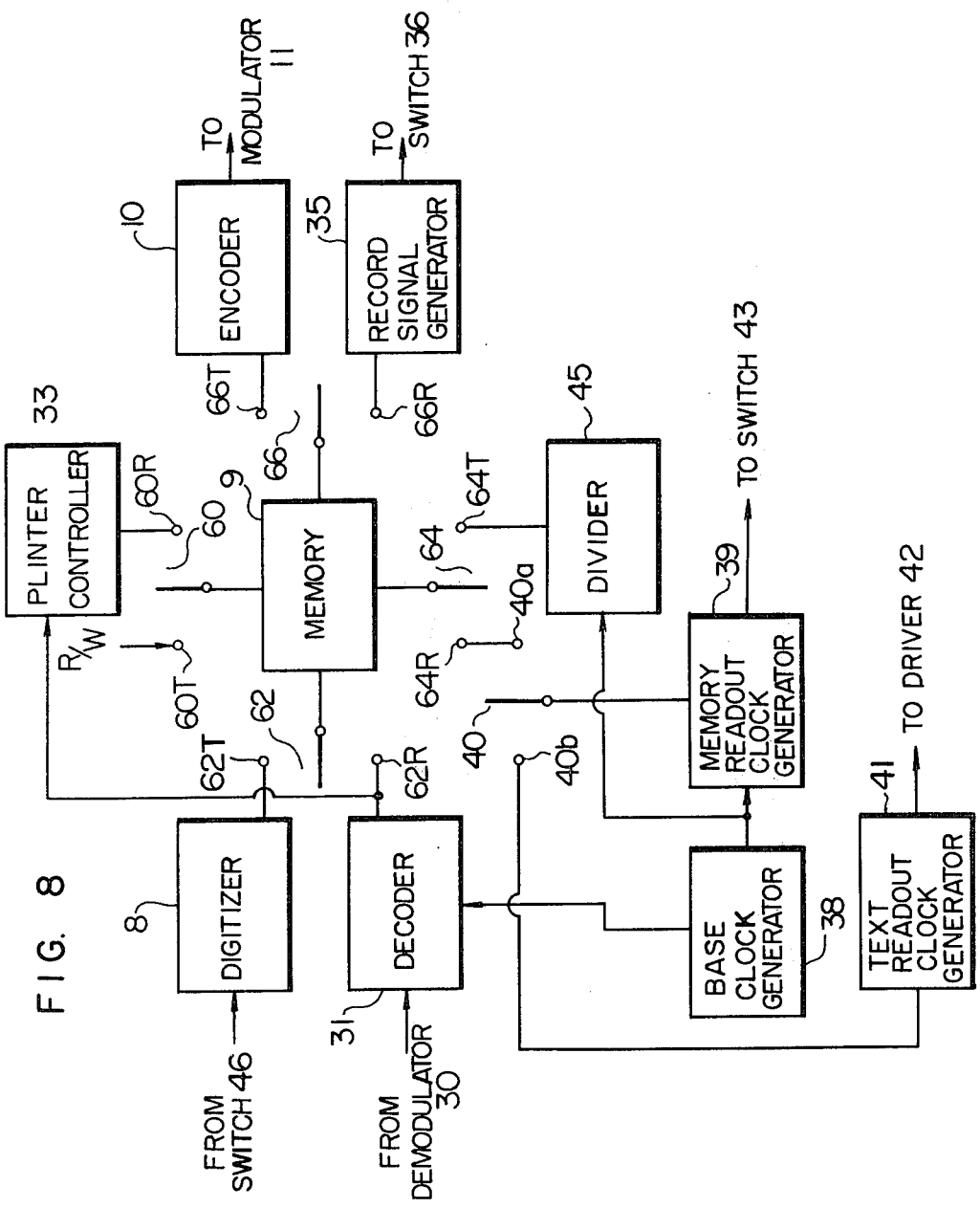
FIG. 8 shows a schematic configuration of another embodiment of the facsimile apparatus of the present invention.

FIG. 8 shows a configuration of the facsimile apparatus thus constructed. The memory 32 of the receiving unit is omitted and the memory 9 is shared by the transmitting unit and the receiving unit, and the input/output signals to and from the memory 9 are switched by switches 60, 62, 64 and 66 so that the memory 9 functions as a transmitting unit memory and a receiving unit memory. When the facsimile apparatus is used as a transmitting station, the movable contacts of the switches 60, 62, 64 and 66 are thrown to contacts 60T, 62T, 64T and 66T, respectively, and when the apparatus is used as a receiving station, they are thrown to contacts 60R, 62R, 64R and 66R.

In the embodiment shown in FIG. 6, the laser beam recording means is used as the recording means in the receiving unit. Alternatively, a light emitting diode array or a light bulb array may be used. FIG. 9 shows an arrangement of the receiving unit which uses the light emitting diode array.

In FIG. 9, like numerals to those shown in FIG. 6 denote elements having like functions. A memory readout clock generator 39' frequency-divides the output base clock from the base clock generator 38 at a predetermined dividing ratio and supplies the divided clock to the memory 32 through the switch 40. Accordingly, the memory 32 is ready for readout in response to the start of a readout signal from the printer control circuit 33, and the digital information signal is sequentially read out in response to the output clock from the memory readout clock generator 39'. The digital information signal read out is supplied to a light emitting diode array 72 through the record signal generator 35, the switch 36, a driver 37' and the modulator 70 to sequentially drive the light emitting diode array 72 to record to image of the text 1 on the recording medium.

In accordance with the present facsimile apparatus thus far described, when it is functioning as a transmitting station, the sending text 1 is fed at a constant speed which can be sufficiently high because of the constant speed feed. Accordingly, a high speed readout of the image information of the text 1 is attained with a simple construction. Since the band compressed system can be used in the transmitting mode to transmit the information signal at a high signal density while making use of the maximum transmission capability of the transmission line 12, the utilization factor of the transmission line 12 is increased. When the image information signal includes a number of transitions, it is disadvantageous to transmit it in the band compressed system because a long transmission time is needed. However, since the image information signal to be transmitted is temporarily stored in the memory 9, the number of transitions can be counted by the start of record signal generating circuit 13 before the transmission to determine if the image information signal is to be fully or partially converted to the analog transmission system. In this manner, the transmission time can be reduced.

When the facsimile apparatus is functioning as a receiving station, the received signal is temporarily stored in the memory and it is read out by the constant period clock for the scan lines and by the variable period clock for the picture cells in the scan line, and the read-out information signal is reproduced by the mirror deflection scanning type laser beam recording means. Since the recording operation of the recording means is carried out at a constant speed, the construction of the recording means can be simplified and a high quality image is reproduced at a high speed. Since the recording medium may be plain paper, the running cost is reduced. By way of example, the laser beam recording means using the electrography technique can not offer the reproduction of an image sufficient for practical use because the image forming characteristic changes with the rotation speed of the photo-conductive drum 15. However, it is essential to use the band compressed transmission system in order to increase the utilization factor of the transmission line 12 to reduce the transmission time. In order to satisfy those imcompatible requirements, the present facsimile apparatus uses the memory 32 having a memory capacity of at least one page of information, and noting the fact that the recording speed of the laser beam recording means is very high, the information is read out of the memory 32 at a rate the synchronized to the rotating speed of the drum 15, immediately before the end of the receipt of the information signal to start the recording of the information signal so that the recording is completed substantially simultaneously with the end of the receipt of the information signal. Accordingly, the image can be recorded faster. However, since the recording speed of the laser beam recording means is so high that it can record the information of size A4 text in several seconds, it is not paractically inconvenient even if the recording is started after the receipt of the signal.

Because of the ability to record the image at such a high speed, information for retransmission when the recording fails or information for determining the acceptability of the receipt of the succeeding text information can be transmitted from the receiving station to the transmitting station in an early stage. When the memory having a memory capacity of two pages of information is used to erase the memory content after the correct recording of the image has been confirmed, the rescanning of the text or the retransmission of the information signal can be eliminated.

The image signal read from the memory 32 by the clock signal is the RZ (Return-to-Zero) signal. However, since this image information signal is converted to the NRZ signal before it is recorded by the laser beam recording means, an image which is a more exact replica of the image of the sending text 1 can be reproduced.

Since the image information signal to be recorded is read from the memory 32 at the rate corresponding to the scan speed of the laser beam spot, the construction of the mirror scanner 27 can be simplified.

The present facsimile apparatus can function as a copying machine so that the utilization factor of the apparatus if further increased.

While the information stored in the memory 9 is the image information signal representing white and black picture cells in the illustrated embodiment, a coded signal may be stored in the memory when a high speed memory such as an IC memory is used. This storage system is advantageous when the information quantity is low. While the transmitting unit memory and the receiving unit memory are separately provided in the illustrated embodiment, they are shown for facilitating the understanding of the present invention and they may share a common memory through an input/output switching circuit.

As described hereinabove, according to the present invention, a low cost facsimile apparatus which can record a high quality of image at a high speed is provided by recording the image by the scanning type recording means having a constant recording medium feed speed, transmitting the image information signal of the text read at the constant rate in the band compressed transmission system, storing the at least one text page of the transmitted image information in the memory and controlling the scanning type recording means to read out the image information signal from the memory such that the scanning type recording means records the image at a constant speed.

We claim:

1. A facsimile apparatus having a transmitting unit for scanning an image of a text to produce an image information signal and converting the image information signal to a coded information signal in a band compressed transmission system for transmission through a transmission line, and a receiving unit for decoding the coded information signal transmitted through the transmission line to reproduce the image information on a recording medium, said facsimile apparatus comprising:

memory means for storing the information signals representing the image of the text to be transmitted and received, said memory means having a memory capacity of at least one page information of said text;

said transmitting unit comprising:

photo-electric conversion means for converting optical information obtained by scanning the image of the text into an electric information signal;

first clock generating means for generating a timing clock for reading out the electric information signal from said photo-electric conversion means; and first converting means for converting the electric information signal read out from said photo-electric conversion means in response to the output from said first clock generating means to the coded information signal to be transmitted through the transmission line;

said receiving unit comprising;

second clock generating means for generating a timing clock for reading out the received information signal stored in said memory means;

second converting means for converting the information signal read out from said memory means into analog information signals;

scanning type recording means for feeding said recording medium at a constant speed and recording the image on said recording medium in accordance with the analog information signal read from said second converting means;

first switch means selectively changed over between a first state where the output of said second clock generating means is allowed to be applied to said memory means and a second state;

second switch means selectively changed over between a first state where the output of said first clock generating means is allowed to be applied to said photo-electric conversion means and a second state where the output of said second clock generating means is allowed to be applied to said photo-electric conversion means when said first switch means is in the second state;

third swtich means selectively changed over between a first state where the output of said second converting means is allowed to be applied to said recording means and a second state where the output of said photo-electric conversion means is allowed to be applied to said recording means;

said facsimile apparatus operates as a facsimile when each of said first, sacond and third switch means is in said first state and said memory means is responsive to the timing clock from said second clock generating means to sequentially read out the information signal such that a scanning-start timing at each scanning line in said recording means is repeated with a constant period; and said facsimile apparatus operates as a copying means for recording the image information signal obtained at the transmitting unit on the recording medium at the receiving unit thereof and said photo-electric conversion means is responsive to the timing clock from said second clock generating means to sequentially read out the information signal such that a scanning-start timing at each scanning line in said recording means is repeated with a constant period.

2. A facsimile apparatus having a transmitting unit for scanning an image of a text to produce an image information signal and for converting the image information signal to a coded information signal in a band compressed transmission system for transmission through a transmission line, and a receiving unit for decoding the coded information signal transmitted through the transmission line to reproduce the image information on a recording medium, said facsimile apparatus including memory means for storing the information signals representing the image of the text to be transmitted and received, said memory means having a memory capacity of at least one page of information of said text;

A. said receiving unit including:

clock generating means for generating a timing clock for reading out the received information signal stored in said memory means;

means for converting the information signal read out from said memory means into an analog information signal; and scanning type recording means for feeding said recording medium at a constant speed and recording the image on said recording medium in accordance with the analog information signal read from said converting means; and B. said transmitting unit including:

start-of-write signal generating means for counting the number of information signals to be transmitted, including means for calculating the time required to send out the information signals to be transmitted in the form of the band compressed coded signal based on the counted value and means for generating a start-of-record signal indicating the start of writing by said recording means based on the calculated time, and means for transmitting said start of record signal to said receiving unit through said transmission line together with said coded information signal; wherein said memory means is responsive to the timing clock from said clock generating means to sequentially read out the information signal such that a scanning-start timing at each scanning line in said recording means is repeated with a constant period.

3. A facsimile apparatus according to claim 2, wherein said memory means includes a first memory provided in said transmitting unit for storing the information signal to be transmitted and a second memory provided in said receiving unit for storing the information signal received.

4. A facsimile apparatus having a transmitting unit for scanning an image of a text to produce an image information signal and for converting the image information signal to a coded information signal in a band compressed transmission system for transmission through a transmission line, and a receiving unit for decoding the coded information signal transmitted through the transmission line to reproduce the image information on a recording medium, said facsimile apparatus including memory means for storing the information signals representing the image of the text to be transmitted and received, said memory means having a memory capacity of at least one page of information of said text;

A. said receiving unit comprising:
 clock generating means for generating a timing clock for reading out the received information signal stored in said memory means;
 means for converting the information signal read out from said memory means into an analog information signal; and
 scanning type recording means for feeding said recording medium at a constant speed and for recording the image on said recording medium in accordance with the analog information signal read from said converting means; and B. said transmitting unit including:
 clock signal generator means for generating a clock signal with a constant frequency; and
 an encoding circuit for converting said read-out information signal to a band compressed coded signal for transmission through said transmission line;
 said memory means including means for storing the scanned information signal and for reading out the stored information sequentially in accordance with the constant period clock produced from said clock signal generator means, and means responsive to the timing clock from said clock generating means for sequentially reading out the information signal such that a scanning-start timing at each scanning line in said recording means is repeated with a constant period.

5. A facsimile apparatus according to claim 4, wherein said memory means includes a first memory provided in said transmitting unit for storing the information signal to be transmitted and a second memory provided in said receiving unit for storing the information signal received.

6. A facsimile apparatus according to claim 5, wherein said transmitting unit includes start-of-write signal generating means for counting the number of information signals to be transmitted, including means for calculating the time required to send out the information signals to be transmitted in the form of the band compressed coded signal based on the count and means for generating a start-of-record signal indicating the start of writing by said recording means based on the calculated time, and means for transmitting said start-of-record signal through said transmission line together with said coded information signal.

7. A facsimile apparatus according to claim 4 or 6 wherein said start of record signal generating means generates said start of record signal at such a timing that the writing by said recording means is completed simultaneously with the termination of the send-out of the information signal from said transmitting unit.

* * * * *